US006872440B1

(12) United States Patent
Kiik et al.

(10) Patent No.: US 6,872,440 B1
(45) Date of Patent: Mar. 29, 2005

(54) HEAT REFLECTIVE COATED STRUCTURAL ARTICLE

(75) Inventors: Matti Kiik, Richardson, TX (US); Robert Joseph Tobin, Double Oak, TX (US); Louis T. Hahn, Waxahachie, TX (US); Margie A. Beerer, Ennis, TX (US); Younger Ahluwalia, Desoto, TX (US)

(73) Assignee: Elk Premium Building Products, Inc., Dallas, TX (US)

( * ) Notice: Subject to any disclaimer, the term of this patent is extended or adjusted under 35 U.S.C. 154(b) by 456 days.

(21) Appl. No.: 09/712,399

(22) Filed: Nov. 14, 2000

Related U.S. Application Data

(63) Continuation-in-part of application No. 09/663,255, filed on Sep. 15, 2000, now Pat. No. 6,586,353.
(60) Provisional application No. 60/168,057, filed on Nov. 30, 1999.

(51) Int. Cl.⁷ .............................. D06N 7/04; B32B 5/16; B32B 18/00; B32B 17/10; B32B 27/00
(52) U.S. Cl. ...................... 428/141; 428/220; 428/323; 428/325; 428/330; 428/332; 428/430; 428/435; 428/436; 428/441; 428/475.5; 428/500; 428/524; 428/923; 428/926
(58) Field of Search ................................. 428/330, 430, 428/435, 436, 441, 475.5, 500, 524, 923, 926, 144, 143, 147, 148, 196, 200, 220, 323, 325, 327–329, 331, 332, 411.1, 423.1, 426, 474.4, 480, 489, 492

(56) References Cited

U.S. PATENT DOCUMENTS

| | | | |
|---|---|---|---|
| 74,606 A | 2/1868 | Schanck | 106/275 |
| 79,645 A | 7/1868 | Ferguson | 106/275 |
| 83,539 A | 10/1868 | Pinnher | 106/275 |
| 3,450,192 A | 6/1969 | Hay | 165/49 |
| 3,563,305 A | 2/1971 | Hay | 165/49 |
| 3,603,221 A | 9/1971 | Barton et al. | 404/31 |
| 3,616,173 A | 10/1971 | Green et al. | 428/331 |
| 3,634,293 A | 1/1972 | Bonitz | 524/8 |
| 3,721,578 A | 3/1973 | Bennett et al. | 442/85 |
| 3,841,885 A | 10/1974 | Jakel | 106/663 |
| 3,954,555 A | 5/1976 | Kole et al. | 162/136 |
| 3,992,340 A | 11/1976 | Bonitz | 524/59 |
| 3,994,278 A | 11/1976 | Pittinger | 126/591 |
| 4,044,188 A | 8/1977 | Segal | 428/297.4 |
| 4,073,997 A | 2/1978 | Richards et al. | 442/374 |
| 4,079,158 A | 3/1978 | Kennepohl et al. | 428/143 |
| 4,082,080 A | 4/1978 | Pittinger | 126/714 |
| 4,082,885 A | 4/1978 | Rashid et al. | 442/72 |
| 4,130,516 A | 12/1978 | Gagle et al. | 524/71 |
| 4,135,022 A | 1/1979 | Kennepohl et al. | 428/143 |
| 4,186,236 A | 1/1980 | Heitmann | 428/374 |
| 4,212,912 A | 7/1980 | Wartusch et al. | 442/374 |
| 4,212,913 A | 7/1980 | Auten | 428/209 |
| 4,214,032 A | 7/1980 | Csikós et al. | 442/44 |
| 4,229,329 A | 10/1980 | Bennett | 442/86 |
| 4,265,962 A | 5/1981 | May | 524/44 |
| 4,273,685 A | 6/1981 | Marzocchi et al. | 442/82 |
| 4,291,086 A | 9/1981 | Auten | 523/150 |
| 4,306,911 A | 12/1981 | Gordon et al. | 442/29 |
| 4,313,968 A | 2/1982 | Sickles et al. | 106/644 |
| 4,331,726 A | 5/1982 | Cleary | 427/483 |
| 4,332,705 A | 6/1982 | Uffner | 428/143 |
| 4,388,366 A | 6/1983 | Rosato et al. | 523/206 |
| 4,405,680 A | 9/1983 | Hansen | 442/180 |
| 4,460,737 A | 7/1984 | Evans et al. | 524/584 |
| 4,468,430 A | 8/1984 | Ruede | 442/85 |
| 4,472,243 A | 9/1984 | Bondoc et al. | 162/135 |
| 4,473,610 A | 9/1984 | Davis | 428/143 |
| 4,478,610 A | 10/1984 | Parekh et al. | 51/298 |

(Continued)

FOREIGN PATENT DOCUMENTS

| | | |
|---|---|---|
| DE | 289082 | 4/1991 |
| EP | 764748 | 3/1997 |
| GB | 1228592 | 5/1971 |
| WO | PCT/US87/01474 | 1/1988 |
| WO | 9900338 | 1/1999 |

OTHER PUBLICATIONS http://eetd.lbl.gov/HIP/LEARN/Standards/Standards 99–18.html, last modified May 13, 1999.

Vinyl Single–ply Roofing, Published on–line at www.vinyl-bydesign.com/roofing/environmental.html/, accessed Sep. 18, 2000.

Cool Systems for Hot Cities, H. Akbari et al., Professional Roofing, Oct. 1998, published on–line at www.professionalroofing.net, ©2000, accessed Sep. 18, 2000.

Roof Coatings, published on–line at http://eetd.lbl.gov/cool-roof/coating.htm, accessed Oct. 3, 2000.

Asphalt Shingles, published on–line at http://eetd.lbl.gov/coolroof/asshingl.htm, accessed Oct. 3, 2000.

(Continued)

*Primary Examiner*—Sheeba Ahmed
(74) *Attorney, Agent, or Firm*—Baker Botts LLP

(57) ABSTRACT

The present invention relates to a heat reflective coated structural article comprising a heat reflective component and a coated structural article component which comprises a substrate having an ionic charge coated with a coating having essentially the same ionic charge. The coating of the coated structural article consists essentially of a filler material and a binder material wherein the binder material bonds the filler material together and to the substrate and wherein the coating does not bleed through the substrate. Nonlimiting examples of the heat reflective component include, elastomeric coatings, aluminum fiber coatings, acrylic and polyurethane coating systems, ceramic coatings insulating paints, metal pigment paints, metal pigment pastes and aluminum flakes. The heat reflective coated structural article of the present invention may be incorporated into commercial roofing products.

27 Claims, No Drawings

U.S. PATENT DOCUMENTS

| | | | |
|---|---|---|---|
| 4,506,060 A | 3/1985 | White, Sr. et al. | 525/163 |
| 4,513,045 A | 4/1985 | Bondoc et al. | 428/137 |
| 4,521,478 A | 6/1985 | Hageman | 442/374 |
| 4,555,543 A | 11/1985 | Effenberger et al. | 524/520 |
| 4,559,267 A | 12/1985 | Freshwater et al. | 428/352 |
| 4,560,612 A | 12/1985 | Yau | 442/176 |
| 4,571,356 A | 2/1986 | White, Sr. et al. | 428/143 |
| 4,599,258 A | 7/1986 | Hageman | 428/140 |
| 4,609,709 A | 9/1986 | Yau | 525/164 |
| 4,610,918 A | 9/1986 | Effenberger et al. | 442/68 |
| 4,612,238 A | 9/1986 | DellaVecchia et al. | 442/180 |
| 4,623,390 A | 11/1986 | Delmonico | 106/15.05 |
| 4,647,496 A | 3/1987 | Lehnert et al. | 442/386 |
| 4,654,235 A | 3/1987 | Effenberger et al. | 427/407.3 |
| 4,664,707 A | 5/1987 | Wilson et al. | 106/18.11 |
| 4,683,165 A | 7/1987 | Lindemann et al. | 442/173 |
| 4,738,884 A | 4/1988 | Algrim et al. | 428/57 |
| 4,745,032 A | 5/1988 | Morrison | 428/215 |
| 4,746,560 A | 5/1988 | Goeden | 428/151 |
| 4,755,545 A | 7/1988 | Lalwani | 524/64 |
| 4,764,420 A | 8/1988 | Gluck et al. | 428/317.7 |
| 4,784,897 A | 11/1988 | Brands et al. | 428/219 |
| 4,810,569 A | 3/1989 | Lehnert et al. | 442/386 |
| 4,812,356 A * | 3/1989 | Meyer et al. | 428/220 |
| 4,835,004 A | 5/1989 | Kawanishi | 427/458 |
| 4,837,095 A | 6/1989 | Hageman | 442/374 |
| 4,879,173 A | 11/1989 | Randall | 442/86 |
| 4,889,880 A | 12/1989 | Miller | 524/71 |
| 4,917,764 A | 4/1990 | Lalwani et al. | 162/156 |
| 4,944,818 A | 7/1990 | Dybsky et al. | 156/71 |
| 5,001,005 A | 3/1991 | Blanpied | 442/373 |
| 5,015,711 A | 5/1991 | Simonet et al. | 526/301 |
| 5,019,610 A | 5/1991 | Sitz et al. | 524/61 |
| 5,030,507 A | 7/1991 | Mudge et al. | 442/147 |
| 5,099,627 A | 3/1992 | Coulton et al. | 52/408 |
| 5,110,839 A | 5/1992 | Chao | 236/49.4 |
| 5,112,678 A | 5/1992 | Gay et al. | 521/83 |
| 5,148,645 A | 9/1992 | Lehnert et al. | 442/173 |
| 5,192,366 A | 3/1993 | Nishioka et al. | 52/443 |
| 5,220,762 A | 6/1993 | Lehnert et al. | 106/724 |
| 5,232,530 A | 8/1993 | Malmquist et al. | 52/408 |
| 5,318,844 A | 6/1994 | Brandon | 156/78 |
| 5,334,648 A | 8/1994 | Drews et al. | 428/357 |
| 5,342,680 A | 8/1994 | Randall | 442/71 |
| 5,347,785 A | 9/1994 | Terrenzio et al. | 52/555 |
| 5,369,929 A | 12/1994 | Weaver et al. | 52/557 |
| 5,371,989 A | 12/1994 | Lehnert et al. | 52/309.17 |
| 5,391,417 A | 2/1995 | Pike | 428/143 |
| 5,393,794 A | 2/1995 | Sperber | 521/78 |
| 5,397,631 A | 3/1995 | Green et al. | 428/219 |
| 5,401,588 A | 3/1995 | Garvey et al. | 428/703 |
| 5,437,717 A | 8/1995 | Doyle et al. | 75/474 |
| 5,437,923 A | 8/1995 | Kalkanoglu | 442/140 |
| 5,445,878 A | 8/1995 | Mirous | 442/327 |
| 5,476,542 A | 12/1995 | Doyle et al. | 106/219 |
| 5,496,400 A | 3/1996 | Doyle et al. | 106/220 |
| 5,501,730 A | 3/1996 | Duong et al. | 106/281.1 |
| 5,518,586 A | 5/1996 | Mirous | 162/156 |
| 5,551,203 A * | 9/1996 | Alderman et al. | 52/746.11 |
| 5,573,586 A | 11/1996 | Yap et al. | 106/668 |
| 5,580,376 A | 12/1996 | Hayner | 106/284.1 |
| 5,580,378 A | 12/1996 | Shulman | 106/677 |
| 5,601,680 A | 2/1997 | Kuszaj et al. | 156/242 |
| 5,601,888 A | 2/1997 | Fowler | 428/34 |
| 5,604,274 A | 2/1997 | Gallagher et al. | 524/69 |
| 5,665,442 A | 9/1997 | Andersen et al. | 428/36.4 |
| 5,687,517 A | 11/1997 | Wiercinski et al. | 52/177 |
| 5,691,033 A * | 11/1997 | Davies | 428/147 |
| 5,698,304 A | 12/1997 | Brandon et al. | 428/215 |
| 5,717,012 A | 2/1998 | Bondoc et al. | 524/13 |
| 5,718,785 A | 2/1998 | Randall | 156/39 |
| 5,776,841 A | 7/1998 | Bondoc et al. | 442/320 |
| 5,795,380 A | 8/1998 | Billings et al. | 106/675 |
| 5,884,446 A | 3/1999 | Hageman | 52/408 |
| 5,965,257 A | 10/1999 | Ahluwalia | 428/357 |
| 5,993,523 A | 11/1999 | Keemer et al. | 106/14.21 |
| 6,500,560 B1 * | 12/2002 | Kiik et al. | 428/489 |
| 6,586,353 B1 * | 7/2003 | Kiik et al. | 442/320 |

OTHER PUBLICATIONS

Cool Roofs Instrumentation, published on line at http://eetd.lbl.gov/HeatIsland/CoolRoofs/Instruments/, last modified Apr. 27, 2000.

Collaboration with Industry, published on–line at http://eetd.LBL.gov/HeatIsland/CollRoofs/Coolaborators/, last modified Apr. 27, 2000.

Roofing Membranes, publsihed on–line at http://EandE.lbl.gov/CoolRoof/membrane.htm, accessed Oct. 27, 2000.

Measurements and Database for Cool Roofing Materials, P. Berdahl et al., published on line at http://eetd.lbl.gov/HeatIsland/CoolRoofs/Overview/CoolRoofs99–01.html, last modified on Jun. 16, 1999.

Standard Test Method for Solar Absorbance, Relfectance, and Transmittance of Materials Using Integrating Spheres, ASTM Designation: E903–96, May 1996.

Standard Tables for References Solar Spectral Irradiance at Air Mass 1.5: Direct Normal and Hemispherical for a 37° Tilted Surface, Designation G 159–98, Mar. 1999.

Energy Star Roof Products Program: Background Information, Partners, & Compliant Product List, Feb. 2000.

Mule–Hide Roof Coating Systems published on line at www.betterroofing.com/res.html, last modified Mar. 30, 1997.

Product Description for LO/MIT™–I/II accessed on May 12, 2000 on–line at www.solec.org/LOMIThome.htm].

Roofing as an Energy Asset, David Koziowski, Maintenance Solutions, Nov. 1999, published on–line at www.facilitiesnet.com/fn/NS/NS3m9kh.html.

Durability of High–Albedo Roof Coatings, Sarah Bretz et al., Recent Reseach in the Building Energy Analysis Group at the Lawrence Berkley Labs., Issue #5, Feb. 1994 published on–line at http://EETD.LBL/gov/EA/Buildings/Research/Albedo.html.

Reflections on a Cool Roof, R. Fricklas, Roofing Industry Educational Institute (RIEI) Information Letter, Spring 1999, published on–line at www.northstarcsi/tech–coolroof-.htm.

Revisitive Reflecting Roof Surfaces, G. Teitsma, Professional Roofing Jan. 2001, pp. 18–21.

Demonstration of Energy Savings of Cool Roofs, S. Konopacki et al., published on–line at http://eetd.lbl.gov/EA/Reports/40673/, last modified Apr. 27, 2000.

http://eetd.lbl.gov/CoolRoof/ref 01.htm, accessed Sep. 18, 2000.

Technical Product Data Sheeet #726, Aluminum Fibered Roof Coating, available on line at www.malarkey–rfg.com/726.htm, effective Nov. 8, 1999, accessed on May 12, 2000.

Ceramic Cover product description, available on line at http://thermalprosystems.com accesssed on May 12, 2000.

* cited by examiner

HEAT REFLECTIVE COATED STRUCTURAL ARTICLE

CROSS REFERENCE TO RELATED APPLICATION(S)

This application is a continuation-in-part of U.S. application Ser. No. 09/663,255 filed on Sep. 15, 2000 now U.S. Pat No. 6,586,353 B1, which claims priority under 35 U.S.C. § 119(e) to Provisional Application No. 60/168,057, filed Nov. 30, 1999.

FIELD OF THE INVENTION

This invention relates to a heat reflective coated structural article useful in, for example, commercial roofing applications comprising a heat reflective component and a coated structural article component which comprises a substrate having an ionic charge coated with a coating having essentially the same ionic charge. The heat reflective coated structural article of the present invention is useful for reducing cooling costs when used as a final layer of a roofing system, particularly a commercial roofing system.

BACKGROUND OF THE INVENTION

Conventional roofing for commercial and industrial buildings usually consists of a roof deck covered by a layer of insulation followed by a water proof membrane and an exterior surface. Many commercial buildings have flat roofs upon which a commercial roofer commonly applies roll roofing in large single sheets. Asphalt is generally applied to the surface of the roof and the roll roofing is then applied on top of the asphalt. Alternatively, the roll roofing may have a layer of asphalt on one surface which is heated to apply the roll roofing to the roof.

There are many problems involving undesirable heat transfer associated with conventional commercial roofing because the roof absorbs solar energy from the sun. As a result, the roof becomes very hot during the day, causing higher interior temperatures and resulting in higher cooling costs. Typical roofing materials such as mineral cap sheets, modified bitumen, asphalt, and gravel can absorb more than 70 percent of the solar energy that falls on them. Roofs having dark roofing materials, which tend to absorb more of the sun's solar energy, may become as hot as 88° C. (190° F.) on a sunny day. Even lighter colored roofing materials (e.g. white or green) can become as hot as 79° C. (175° F.).

Certain insulation materials and constructions have been disclosed in the past to reduce cooling costs, including using a liquid medium located on a building structure which can be cooled, such as a water jacketed enclosure. See U.S. Pat. Nos. 3,450,192 and 3,563,305 of Hay. U.S. Pat. Nos. 3,994,278 and 4,082,080 of Pittinger disclose heating and cooling systems which utilize an energy source and a fluid body as a storage medium. The fluid body is distributed over the roof of a building and includes mechanisms for regulating the temperature within the enclosed structure. In these types of systems, optimum cooling efficiency cannot be obtained and an external source is needed to obtain the cooling, which results in additional costs.

Other methods for reducing cooling costs comprise applying a reflective coating onto the roof after the roof has been installed (retrofitted coatings) which reduce the amount of solar energy that is absorbed by the roof. Reflective coatings can reflect much of the sun's heat rays and can lead to reduced interior building temperatures and reduced cooling costs. For example, white roof coatings can reflect 70% to 80% of the sun's energy. Reflective coatings may include, inter alia, elastomeric coatings, aluminum fiber coatings, acrylic and polyurethane coating systems such as Mule-Hide acrylic and polyurethane coating systems available from Better Roofing Mid Atlantic, Inc. (Jacksonville, N.C.), ceramic coatings, insulating paints such as those disclosed in U.S. Pat. No. 4,623,390 of Delmonico, metal pigment paints, and metal pigment pastes such as those disclosed in U.S. Pat. No. 5,993,523 of Keemer et al. By making the roof less absorptive of the sun's heat rays, significant cooling-energy savings can be achieved. In addition, lighter colored roofs tend to last longer. See <http://www.energy-seal.com> visited May 12, 2000.

The Environmental Protection Agency (EPA) and the Department of Energy (DOE) have organized the Energy Star® Roof Products Program which is aimed at reducing cooling costs by using cool roofing products. See <http://www.energy-seal.com> visited May 12, 2000. The EPA and the DOE have recognized the energy-saving cost benefits of using reflective coatings on roofs and are advocating their use. The Energy Star® label can be used on reflective roof products that meet the EPA's specifications for solar reflectance and reliability to help consumers identify energy-efficient products. For example, the Energy Star® label may be used on roof products for low-slope roofs (surfaces with a slope of 2:12 inches or less) that have an initial solar reflectance greater than or equal to 0.65 and that have a solar reflectance greater than or equal to 0.5 three years after installation under normal conditions. As another example, the Energy Star® label may be used on roof products for steep-slope roofs (surfaces with a slope greater than 2:12 inches) that have an initial solar reflectance greater than or equal to 0.25 and that have a solar reflectance greater than or equal to 0.15 three years after installation under normal conditions.

The solar reflectance of roofing products can vary dramatically. For example, the solar reflectance of commercial asphalt shingles is rather low. Premium white shingles have a solar reflectance of around 30%, and other colors reflect less. See
<http://eetd.lbl.gov/coolroof/asshingl.htm> visited Oct. 27, 2000. The solar reflectance of smooth bitumen roofing membrane is around 6%.
<http://EandE.LBL.gov/coolroof/membrane.htm> visited Oct. 27, 2000. The solar reflectance of new, bare galvanized steel is 61%. See
<http://EandE.LBL.gov/CoolRoof/metal.htm#metal> visited Oct. 27, 2000.

While the cost benefits of reflective coated cool roofing are documented, the cost of installing cool roofing is also an issue. Conventional commercial roll roofing is often coarse and can absorb coating that is applied to it. Such coarse roofing products require the use of significant amounts of reflective coating, which can be costly. Furthermore, conventional commercial roofing generally uses other components such as heavy glass mats, granules and finishes which add to the material and installation costs. Furthermore, conventional commercial roofs require that the coating be applied after the roof is installed, which also increases installation costs.

Thus, there is a need for an easier, more cost efficient means to apply an energy-efficient reflective surface to commercial roofs. In particular, there is a need for pre-manufactured commercial roofing material which comprises a reflective coating on its surface and is less costly to manufacture and install than conventional commercial roofing materials.

SUMMARY OF THE INVENTION

The present invention provides a heat reflective coated structural article comprising a heat reflective component and a coated structural article component which comprises a substrate having an ionic charge coated with a coating having essentially the same ionic charge. The coating of the coated structural article component consists essentially of a filler material and a binder material wherein the binder material bonds the filler material together and to the substrate and wherein the coating does not bleed through the substrate. The heat reflective component may be selected from the following nonlimiting examples: elastomeric coatings, aluminum fiber coatings, acrylic and polyurethane coating systems such as Mule-Hide acrylic and polyurethane coating systems available from Better Roofing Mid Atlantic Inc. (Jacksonville, N.C.), ceramic coatings, insulating paints, metal pigment pastes, metal pigment paints, coloring dyes, colored coatings, and aluminum flakes.

The heat reflective coated structural article of the present invention can be incorporated into conventional commercial roofing materials to achieve energy-efficient cool roofing materials. Furthermore, the heat reflective coated structural article of the present invention eliminates the need for other products, such as glass mats, granules and other finishes typically used in commercial roofing materials, thus reducing the costs of manufacturing and installing the roofing materials. The commercial roofing materials which incorporate the heat reflective coated structural articles of the present invention are easier to handle than conventional commercial roofing materials and may be lighter in weight than other commercial roofing materials. In addition, they eliminate the need for post-installation application of the heat reflective component and they reduce the amount of heat reflective component necessary, both of which reduce the cost of the roofing material.

DETAILED DESCRIPTION

The applicants have discovered that a cost-efficient heat reflective coated structural article for use in commercial roofing materials can be made by combining a heat reflective component with a coated structural article component. The coated structural article component comprises a substrate having an ionic charge coated with a coating having essentially the same ionic charge. The coating of the coated structural article component consists essentially of a filler material and a binder material. For example, U.S. Pat. No. 5,965,257, which is incorporated herein by reference, teaches that by coating the substrate with a coating having essentially the same ionic charge, a zero bleed through product is made while using only two major ingredients in the coating. By producing a coating having essentially the same ionic charge as the substrate, a zero bleed through product may be produced having a low binder content and no viscosity modifiers.

The coated substrate of the coated structural article component may be any suitable reinforcement material capable of withstanding high temperatures such as glass fibers, polyester fibers, cellulosic fibers, asbestos, steel fibers, alumina fibers, ceramic fibers, nylon fibers, graphite fibers, wool fibers, boron fibers, carbon fibers, jute fibers, polyolefin fibers, polystyrene fibers, acrylic fibers, phenol-formaldehyde resin fibers, aromatic and aliphatic polyamide fibers, polyacrylamide fibers, or mixtures thereof which may include bicomponent or multicomponent fibers.

The filler employed in the coating of the coated structural article component may be class F fly ash, class C fly ash or mixtures thereof. Preferably, the filler is class F fly ash wherein 90% to 95% by weight of the fly ash is aluminosilicate. Such a fly ash, known as Alsil O4TR, is produced by ISG Industries, of Kennesaw, Ga. Alternatively, the filler may be charged calcium carbonate or ceramic microspheres, or a blend of fly ash and calcium carbonate, or a blend of fly ash, calcium carbonate, ceramic microspheres and dolomite.

The table below provides, in percentages, some of the combinations of calcium carbonate, fly ash and ceramic microspheres which may be utilized as the filler component in the coating:

TABLE I

|  | A % | B % | C % | D % | E % | F % |
|---|---|---|---|---|---|---|
| 1. Water | 18.9 | 25.9 | 37.33 | 25.9 | 24.9 | 24.9 |
| 2. Acrylic Latex | 6.0 | 6.0 | 6.42 | 6.0 | 6.0 | 6.0 |
| 3. Fly Ash | 75.0 | 34.0 | — | 40.0 | — | 20.0 |
| 4. CaCO$_3$ | — | 34.0 | — | — | 40.0 | 20.0 |
| 5. Microspheres | — | — | 56.14 | 28.0 | 29.0 | 29.0 |
| 6. Defoamer | 0.1 | 0.1 | 0.1 | 0.1 | 0.1 | 0.1 |
|  | 100% | 100% | 100% | 100% | 100% | 100% |

The microspheres may be a 50/50 ratio of 3M's W1012 microspheres and 3M's smaller diameter G200 microspheres. Although the table shows possible combinations of calcium carbonate, fly ash and ceramic microspheres in the filler component of the coating, it is believed that any combination of these materials may be employed.

The coating of the coated structural article component is prepared by using a binder material such as a high performance heat-reactive acrylic latex polymer to bond the filler materials together and to bond the filler to the substrate. Such a binder material is Hycar 2679 acrylic latex polymer supplied by B.F. Goodrich Company of Cleveland, Ohio. It is believed, however, that any linear polymer, linear copolymer or branched polymer may be useful in preparing the coating. Possible binder materials include butyl rubber latex, SBR latex, neoprene latex, polyvinyl alcohol emulsion, SBS latex, water based polyurethane emulsions and elastomers, vinyl chloride copolymers, nitrile rubbers and polyvinyl acetate copolymers.

In a preferred embodiment, the coating of the coated structural article component may comprise nearly 85% by weight of the structural article. In that coating, approximately from 84% to 96% by weight may be filler and the remainder may be the acrylic latex binder. The filler may be approximately 50% fly ash and 50% calcium carbonate. The substrate may comprise about 15% by weight of the structural article. Glass fibers may comprise approximately 12% by weight of the article and a binder material may comprise about 3% by weight of the article. The binder which bonds together the glass fibers may be from 99% to 75% (preferably 98% to 94%) by weight urea formaldehyde and from 1% to 25% (preferably 2% to 6%) by weight standard acrylic latex.

The substrate of the coated structural article component may be coated by air spraying, dip coating, knife coating, roll coating or film application such as lamination/heat pressing. The coating may be bonded to the substrate by chemical bonding, mechanical bonding and/or thermal bonding. Mechanical bonding may be achieved by force feeding the coating onto the substrate with a knife.

The coated structural article component made in accordance with this invention may be of any shape but preferably, such articles are planar in shape. The substrate is coated on one side or both sides depending on the intended application.

Additionally, the coated structural article component may be coated with a water repellent material. Examples of such water repellent materials include Aurapel 330R, Aurapel 391 available from the Auralux Corporation of Yantic, Conn. and Sequapel available from Sequa Chemical Corporation of Chester, S.C. It is believed that wax emulsions, oil emulsions, silicone emulsions, polyolefin emulsions, surfonyls and silanes as well as other similar performing products may also be suitable water repellent materials.

Further, structural article components made in accordance with the invention may be coated with an algaecide such as zinc powder, copper oxide powder or the herbicides Atrazine available from e.g. Ribelin Industries or Diuron available from e.g. Olin Corporation, an antifungal material such as Micro-Chek 11P, an antibacterial material such as Micro-Chek 11-S-160, a surface friction agent such as Byk-375, a flame retardant material such as ATH (aluminum trihydrate) available from e.g. Akzo Chemicals and antimony oxide available from e.g. Laurel Industries and/or a coloring dye such as T-1133A and iron oxide red pigments, and other products which can impart specific surface functions. The Micro-Chek products are available from the FerroCorporation of Walton Hills, Ohio. Byk-375 may be obtained from Wacker Silicone Corporation of Adrian, Mich. and T-1133A is sold by Abco Enterprises Inc. of Allegan, Mich.

The additional coatings of, e.g. water repellent material, antifungal material, antibacterial material, etc., may be applied to one or both sides of structural articles otherwise having filler/binder coatings on one or both sides of a substrate. For example, structural articles comprising substrates coated on one or both sides with filler/binder coatings could be coated on one side with a water repellent composition and on the other side with an antibacterial agent.

The substrate may be a nonwoven fiberglass mat which is desirable because it is light in weight. Fiberglass mats are also preferred as substrates because of their fire resistant nature, their resistance to moisture damage, their excellent dimensional stability, their resistance to curl with temperature changes, their resistance to rot and decay, their ability to accept organic coatings and their excellent physical properties.

Nonlimiting examples of heat reflective components include, elastomeric coatings, aluminum fiber roof coatings, ceramic coatings, acrylic and polyurethane coating systems, insulating paints such as those disclosed in U.S. Pat. No. 4,623,390 of Delmonico, metal pigment paints, metal pigment pastes such as those disclosed in U.S. Pat. No. 5,993,523 of Keemer et al., coloring dyes, colored coatings, and aluminum flakes.

The heat reflective coated structural article of the present invention has a solar reflectance, as defined by the ASTM Standards of from about 65 to about 100. In a preferred embodiment of the present invention, the heat reflective coated structural article has solar reflectance of from about 70 to about 86. In another embodiment, the heat reflective coated structural article has a visible reflectance of from about 65 to about 100. In another preferred embodiment, the heat reflective coated structural article has a visible reflectance of from about 70 to about 86.

In the present invention, solar reflectance is defined as the fraction of reflected solar energy. One method of determining the solar reflectance involves the use of spectrophotometric measurements with an integrating sphere to determine the reflectance at each different wavelength. The average reflectance is determined by an averaging process using a standard solar spectrum. The spectral range for solar energy is 300 to 2500 nanometers. This method is documented by ASTM (American Society for Testing and Materials) as standards E903 and E892. In the present invention, the visible reflectance is defined as the reflected fraction of the visual part of the solar spectrum, wavelengths 400 to 700 nanometers. The visible part of the solar spectrum does not include the ultra-violet or infrared portion of the solar spectrum.

Preferably, the heat reflective component meets the EPA's requirements and bears the Energy Star® label. EPA compliant heat reflective components include, but are not limited to, Syntec™ and Versico™ (Carlisle Syntec, Inc., Carlisle, Pa.); CXP Ceco™, CLP Ceco™, MAP Ceco™ and MVR Ceco™ (Ceco Building Systems, Columbus, Mich.); Hypalon Hy-Crown™, Rapid Roof HV™ and Benchmark™ (Conklin Co., Inc., Shakopee, Minn.); DSS×1.5 Galvalume™ and DSS×2 Galvalume™ (Delcoa Industries, Inc., Pompano Beach, Fla.); Dura-Loc™ (Dura-Loc Roofing Systems, Ontario, Canada); Ceramicoat EERS International™ and Total Shield Polyurea EERS International™ (EERS International, Inc.); Eraguard 1000™, Eraguard 500™, Erakote™, Erathane 300™ and Permaweld 48 ml™ (Elasotmeric Roofing Systems, Loretto, Minn.); Flex FB Elvaloy™, Flex MF/R Elvaloy™ and Flex MF/R PVC White Membrane (Flex Roofing Systems, Morgantown, Pa.); 502 RCW Elasto-Kote, 505 Elasto-Brite M, 501 Elasto-Brite, 98AF and 298 Alumin-R (Karnak Corporation, Clark, N.J.); Acrylic White (Metacrylics, San Jose, Calif.); AcryShield™ A400, AcryShield™ A500, AcryShield™ A550, AcryShield™ A600 (National Coatings Corporation, Camarillo, Calif.); Stevens EP, Stevens Hypalon (CSM) (Stevens Roofing Systems, Holyoke, Mass.); Weather Barrier 1650 White, and Weather Barrier 1655 White (Weather Barrier, Inc., Manilla, Philippines).

The heat reflective coating may also be selected from the following nonlimiting examples, Lo/Mit™ (SOLEC™, Ewing, N.J.), acrylic and polyurethane Mule-Hide roof coating systems (Better Roofing Mid Atlantic, Inc., Jacksonville, N.C.), Ceramic-Cover (Thermal Protective Systems, L.L.C., Fort Worth, Tex.), and aluminum fibered roof coating #726 (Malarkey Roofing Co., Portland, Oreg.).

The applicants' invention allows commercial roofing manufacturers to incorporate the heat reflective coated structural article of the present invention into their products to achieve a cost-effective, energy-efficient heat reflective product. In addition, the incorporation of the heat reflective coated structural article of the present invention into commercial roofing products eliminates the need for post-installation application of a heat reflective coating. The applicant's invention also requires approximately 25% to 50% less reflective component than is necessary to coat conventional commercial roof products. This is because the surface of the coated structural article component is smoother than conventional commercial roofing products, which are coarse and absorb more of the heat reflective component. Furthermore, other elements of commercial roof products, such as separate glass mats, granules, gravel, asphalt, asphalt emulsions and other finishes are not required, thus making the commercial roofing material which incorporates the heat reflective coated structural article of the present invention lighter, more cost-effective, easier to manufacture and easier to install. Moreover, the applicants' heat reflective coated structural article includes a coated mat which is comprised mainly of nonflammable filler and the mat which is coated by that filled coating is also nonflammable.

The heat reflective component of the present invention is applied to one surface of the coated structural article component and may be applied to the coated structural article component by any means known in the art. If the substrate of the coated structural article component has been coated on both sides, then the heat reflective component may be applied to either side. If only one side of the substrate has been coated, then the heat reflective component is preferably applied to the coated side of the coated structural article component. For example, the heat reflective component may be laminated to the coated structural article component (e.g. applied as a film bonded to the coated structural article) or applied with a brush or by a spraying means or a coating means. Where the manufacturer of the heat reflective component has indicated a preferred means of application, such means may be used to apply the heat reflective component to the structural article. The surface of the heat reflective coated structural article of the present invention is the top layer of a commercial roofing material.

The heat reflective coated structural article of the present invention may be used with a variety of commercial roofing materials including, but not limited to, conventional cap sheet, APP modified bitumen sheet, SBS modified bitumen sheet and built up roofing systems. The heat reflective coated structural article of the present invention may be incorporated into commercial roofing systems, for example, by roll coating a layer of asphalt or modified asphalt to the back of the article; laminating the article to an existing asphalt coated reinforcement as the top layer during manufacturing; post-laminating the article to the top asphalt or modified asphalt layer of an existing roofing membrane using hot asphalt, cold adhesive or heat welding; and installing the article with either hot asphalt or cold adhesive directly as the top layer of a built-up roof.

In one embodiment, the heat reflective coated structural article of the present invention is back coated with an SBS modified bituminous coating to produce a finished cap sheet product which can then be applied directly to a roof using either hot asphalt, heat welding or cold adhesive. Alternatively, a layer of adhesive may be applied to the back of the heat reflective coated structural article to produce a self adhering (peel and stick) product. The product forms the top most layer of the built-up roofing system thereby imparting heat reflectance via the heat reflective coated structural article of the present invention.

In another embodiment, the heat reflective coated structural article of the present invention is applied to a sheet consisting of a glass or polyester mat encased in hot asphalt such that the article is adhered to the top layer of hot asphalt with the reflective surface up. This product can then be applied via heat welding, hot asphalt or cold adhesive over a base sheet as part of a two ply modified bitumen roof.

In a further embodiment, the heat reflective coated structural article of the present invention can be used as the last step in the construction of a built-up roof such that the article is applied to the top layer of hot asphalt in a multi-ply system with the reflective surface of the article facing up on the formed roof surface and imparting heat resistance thereto.

It should be understood that compositions other than those described above can be used while maintaining the principles underlying the present invention. For example, other sources of inert materials as well as mixtures of binders and/or additives can be used in formulating the structural articles. Other suitable types of heat reflective components can be used in combination with the coated substrate to improve the properties of the heat reflective coated structural articles formed therefrom and the heat reflective coated structural article of the present invention may be utilized together with other suitable roofing products to impart heat reflectance properties to the resultant roof.

EXAMPLES

Example 1

Non-water repellant Versashield™ coated structural articles (Versashield™ coated on both sides, available from Elk Corporation in Ennis, Tex.) were coated on one side with one of the following heat reflective materials: 1) ARM-91-1, 2) APC-40-1 (both available from Rohm & Haas Co.), and 3) Sherwin Williams White Paint 20 Year. The Solar Reflectivity for each sample was measured by Rohm & Haas Co.'s Coating Technical Service, Springhouse, Pa., using a Solar Spectrum Reflectometer, Model SSR-ER, Version 5.0. A single tungsten filament source was used that provided diffuse illumination at the sample port. Energy reflected from the sample was measured at an angle of 20 degrees from normal, with four filtered detectors. The detectors were designated UV, Blue, Red and IR indicating the primary wavelength range each covers. The relative response of each detector in combination with the light source was designed to approximate the solar spectrum in its wavelength range. By summing the four outputs in the appropriate proportions, a solar measurement spectrum was obtained. The percentage of Solar Reflectivity is reported in TABLE II.

TABLE II

| Sample ID | Reflectivity (%) | Reflectivity (%) for Those Sample Average |
|---|---|---|
| ARM-91-1 | 85.2 | 84.8 |
|  | 85.0 |  |
|  | 84.2 |  |
| APC-40-1 | 84.5 | 84.3 |
|  | 84.1 |  |
|  | 84.2 |  |
| White Sherwin Williams Paint 20 Year | 75.0 | 74.7 |
|  | 74.5 |  |
|  | 74.5 |  |
| Control-VersaShield ™ | 41.3 | 41.4 |
|  | 41.5 |  |
|  | 41.5 |  |
| Lab Coated Sheet with APC-40-1 | 82.9 | 83.1 |
|  | 83.8 |  |
|  | 82.5 |  |
| Lab Coated Sheet with ARM-91-1 | 83 | 84.0 |
|  | 84.5 |  |
|  | 83.4 |  |

The present invention is not to be limited in scope by the specific embodiments described herein. Indeed, various modifications of the invention in addition to those described herein will become apparent to those skilled in the art from the foregoing description. Such modifications are intended to fall within the scope of the appended claims. Various references are cited herein, the disclosure of which are incorporated by reference in their entireties.

We claim:

1. A heat reflective coated structural article comprising a heat reflective component and a coated structural article component which comprises a substrate having an ionic charge coated with a coating having essentially the same ionic charge wherein said coating consists essentially of a filler material and a binder material and wherein said binder material bonds the filler material together and to the substrate and wherein said coating does not bleed through said substrate.

2. The heat reflective coated structural article according to claim 1 wherein the heat reflective component is selected from the group consisting of elastomeric coatings, aluminum fiber coatings, acrylic coating systems, polyurethane coating systems, ceramic coatings, insulating paints, metal pigment paints, metal pigment pastes, dyes, colored coatings and aluminum flakes.

3. The heat reflective coated structural article according to claim 2 wherein the heat reflective component further comprises a coloring agent selected from the group consisting of coloring dyes and colored coatings.

4. The heat reflective coated structural article according to claim 1 wherein the heat reflective coated structural article has a solar reflectance of from 65% to 100%.

5. The heat reflective coated structural article according to claim 4 wherein the heat reflective coated structural article has a solar reflectance of from 70% to 90%.

6. The heat reflective coated structural article according to claim 1 wherein the heat reflective coated structural article has a solar reflectance of from 74% to 86%.

7. The heat reflective coated structural article according to claim 1 wherein the heat reflective coated structural article has a visible reflectance of from 65% to 100%.

8. The heat reflective coated structural article according to claim 1 wherein the heat reflective coated structural article has a visible reflectance of from 70% to 90%.

9. The heat reflective coated structural article according to claim 1 wherein the heat reflective coated structural article has a visible reflectance of from 74% to 86%.

10. The heat reflective coated structural article according to claim 1 wherein the heat reflective component is applied to one side of the coated structural article.

11. The heat reflective coated structural article according to claim 1 wherein said substrate is planar and is coated on one side with said coating and wherein said heat reflective component is applied to said coating.

12. The heat reflective coated structural article according to claim 1 wherein said substrate is planar and is coated on both sides with said coating.

13. The heat reflective coated structural article according to claim 1 wherein the beat reflective component is less than 2 millimeters thick.

14. The heat reflective coated structural article according to claim 1 wherein said article is incorporated as the top layer into a commercial roofing product.

15. The heat reflective coated structural article according to claim 1 wherein said substrate is fiberglass, said filler is selected from the group consisting of fly ash, calcium carbonate, ceramic microspheres and mixtures thereof and said binder is acrylic latex.

16. The heat reflective coated structural article according to claim 1 wherein the substrate is selected from the group consisting of glass fibers, polyester fibers, cellulosic fibers, asbestos, steel fibers, alumina fibers, ceramic fibers, nylon fibers, graphite fibers, wool fibers, boron fibers, carbon fibers, jute fibers, polyolefin fibers, polystyrene fibers, acrylic fibers, phenolformaldehyde resin fibers, aromatic and aliphatic polyamide fibers, polyacrylamide fibers, polyacrylimide fibers, and mixtures thereof.

17. The heat reflective coated structural article according to claim 1 wherein said heat reflective coated structural article further includes a water repellent material.

18. The heat reflective coated structural article according to claim 1 wherein said heat reflective coated structural article further includes an antifungal material.

19. The heat reflective coated structural article according to claim 1 wherein said heat reflective coated structural article further includes an antibacterial material.

20. The heat reflective coated structural article according to claim 1 wherein said heat reflective coated structural article further includes a flame retardant material.

21. The heat reflective coated structural article according to claim 1 wherein said heat reflective coated structural article further includes a surface friction agent.

22. The heat reflective coated structural article according to claim 1 wherein said heat reflective coated structural article further includes an algaecide.

23. The heat reflective coated structural article according to claim 1 wherein said substrate is bonded together by a binder material consisting essentially of urea formaldehyde and acrylic latex.

24. The heat reflective coated structural article according to claim 1 wherein the coated structural article component is coated with a coating consisting essentially of a filler material and a binder material and wherein
   a) said coated structural article component is from 10% to 25% by weight glass fibers; and
   b) said coating is from 84% to 96% filler selected from the group consisting of fly ash, charged calcium carbonate, ceramic microspheres and mixtures thereof and from 16% to 4% acrylic latex binder material.

25. The heat reflective coated structural article according to claim 24 wherein said coating further includes SBR rubber.

26. The heat reflective coated structural article according to claim 25 wherein said acrylic latex binder and said rubber are cross linked.

27. The heat reflective coated structural article according to claim 24 wherein said glass fibers are bonded together by a mixture of from 99% to 75% urea formaldehyde and from 1% to 25% acrylic latex.

* * * * *